E. M. FAUST.
BRAKE FOR LATHES.
APPLICATION FILED OCT. 27, 1919.
1,354,607.
Patented Oct. 5, 1920.
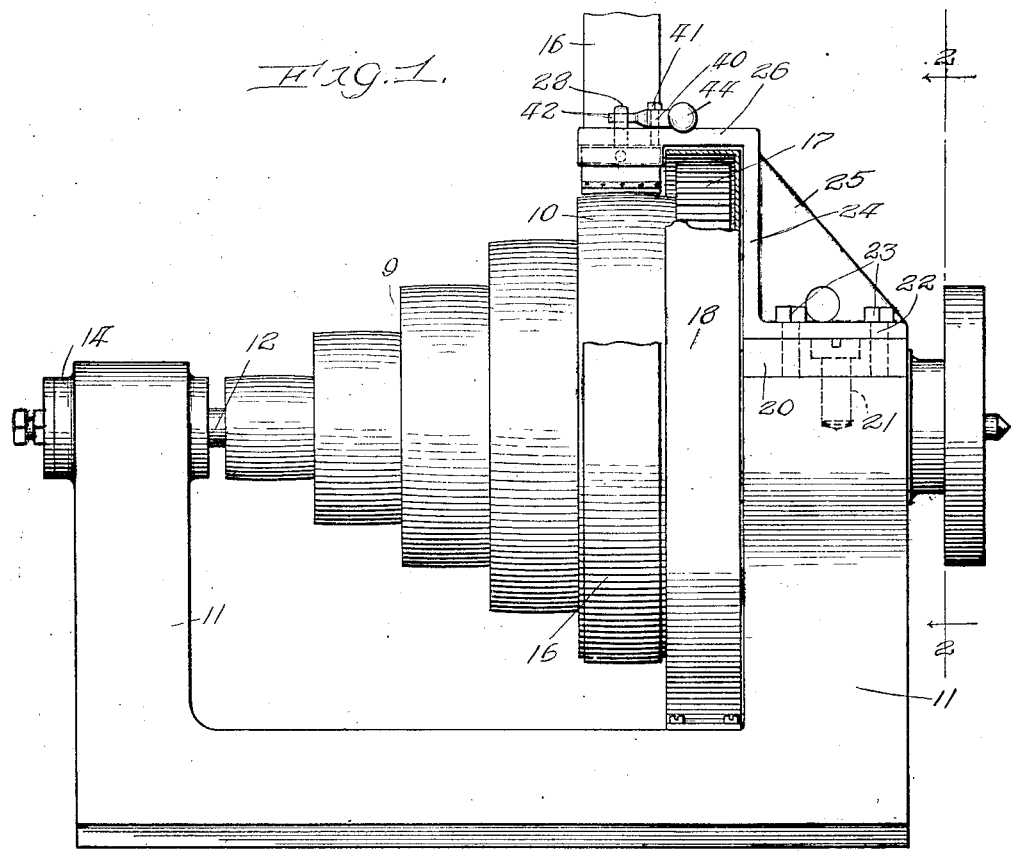
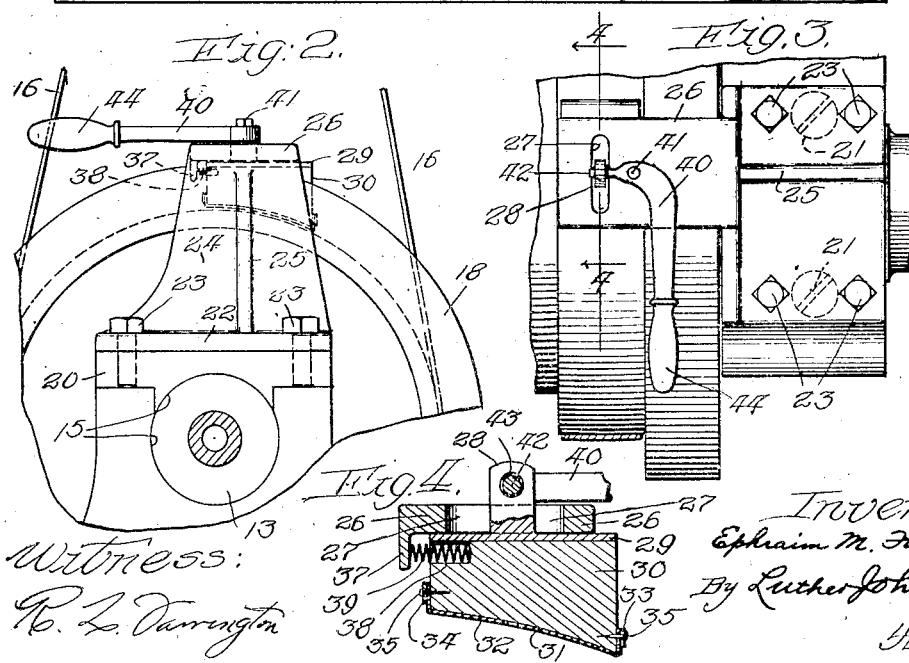

UNITED STATES PATENT OFFICE.

EPHRAIM M. FAUST, OF STEELTON, PENNSYLVANIA.

BRAKE FOR LATHES.

1,354,607.   Specification of Letters Patent.   Patented Oct. 5, 1920.

Application filed October 27, 1919. Serial No. 333,541.

*To all whom it may concern:*

Be it known that I, EPHRAIM M. FAUST, a citizen of the United States, residing at Steelton, Dauphin county, Pennsylvania, have invented certain new and useful Improvements in Brakes for Lathes, of which the following is a specification.

My invention relates to brakes for lathes. When the lathe driving belt is shifted from the overhead driving pulley to the idler the lathe pulley naturally continues to rotate through the momentum it has acquired. When it is desired to stop this rotation, in order to save time or for some other reason connected with the work in hand, the usual practice of the operator is to apply his left hand to the lathe pulley with such pressure as is found feasible, a method which is quite dangerous. Another common expedient for the purpose is to apply a stick of wood as a lever between the pulley and its supporting frame work. I am aware also that mechanical brakes have heretofore been suggested for accomplishing the desired result, as witness the patent to Bullard, No. 408,291, of August 6, 1889, and that to Eberhardt, No. 308,347, of November 25, 1884.

The principal objects of the present improvements are to provide simple, strong and conveniently operated means for braking the lathe, and, in an important aspect, means for this purpose which may readily be secured to lathes already in service, forming an attachment thereto. Other objects and advantages will appear hereinafter.

In the accompanying drawings, which form a part of this specification, I have illustrated these improvements in a form which has proven highly satisfactory in service. Figure 1 is a side view of a lathe head with these improvements attached thereto, a gear casing being broken away; Fig. 2 is a fragmentary end view on the line 2—2 of Fig. 1; Fig. 3 is a top plan of these improvements with fragments of associated lathe parts; and Fig. 4 is a sectional view on an enlarged scale through the brake shoe on the line 4—4 of Fig. 3.

The cone-pulley 9, supporting frame 11, spindle 12 at one end and 13 at the other end of the pulley, the bearings 14 and 15, the gear 17 with its housing 18 and the driving belt 16 are of common construction and arrangement.

The bearing 15 for the spindle 13 is formed by a recess in the frame 11 and by the recessed cap 20 held upon the frame 11 by screws 21 in the usual way.

My improved brake device as illustrated comprises a bracket or support having a foot portion 22 of the size and shape of the top of the cap 20 and is adapted to rest thereon and to be secured thereto by bolts 23. The bracket also includes an upright part 24 reinforced by the web 25.

The bracket or support next includes a substantially horizontal part 26 extending from the part 24 over the casing 18 for the gear 17 and overlying the adjacent belt section 10 of the pulley 9 between the parts of the belt 16 which extend away from this section of the pulley. The part 26 is slotted at 27 to accommodate movably the projection 28 upon the metallic plate 29, to which plate 29 is secured the block 30 which may well be of wood and which is narrower at one end than at the other and is formed with a curved surface at 31 on the arc of the section 10 of the cone-pulley 9. A piece of leather or other suitable facing material 32 is secured upon this surface 31 by two metal strips 33 and 34 held by nails or screws 35.

The block 30 and its connected parts form a brake shoe which, as well seen in Fig. 2, is slidably mounted beneath the free end of the frame part 26 and is between the belt parts illustrated, and is in close association with the section 10 of the pulley, and that owing to the shape of the brake shoe its movement in the direction toward the left, as viewed in Fig. 2, will cause the shoe to become bound between the belt surface of the pulley section 10 and the supporting member 26, causing friction upon the belt surface of the pulley and retarding its rotation.

The bracket part 26 is provided with a downward spring-seat extension 37 and the block 30 is provided with a recess 38 accommodating the compression coil spring 39, and this spring maintains the shoe out of engagement with the pulley when braking is not desired.

In order to move the brake shoe into operative engagement with the pulley I show a bell-crank lever 40 pivotally mounted upon the support 26 by the bolt 41, the rounded end 42 of the bell crank extending loosely through a hole 43 in the projection 28. The shoe is thus maintained in its operative position. The handle 44 upon the lever 40 extends forward and is within convenient reach of the operator's left hand while working at the lathe. It will thus be clear that a pull to the right upon the handle 44, as viewed in Figs. 1 and 3, will cause the brake shoe to be drawn into braking relation to the pulley, and that upon releasing the hand pressure the spring 38 will force the brake shoe out of its braking position.

The integral bracket parts 22, 24, 25 and 26 and the integral plate 29 and projection 28 are suitably made of cast iron. The bell crank 40 may be of wrought iron or steel.

The device thus formed is exceedingly simple of construction, and is of few parts, of parts not likely to get out of order, and the arrangement of parts is such that the braking operation is very simple, rapid and convenient. By positioning the device substantially as illustrated with the brake shoe between the belt parts shown there is no interference by the device with the operation of the machine in any way, and since it is a simple operation to bore and tap the cap 20 for the screws 23 the device may readily be installed upon lathes now in use.

Various changes and modifications of what is specifically herein shown and described are contemplated by me as being within the scope of the invention herein set forth as indicated in the appended claims.

I claim:

1. A lathe brake comprising in combination a support formed to be secured upon a lathe part adjacent to the belt pulley thereof, said support having a part overlying the belt surface of the pulley normally between the parts of the belt extending from opposite sides of the pulley when the device is in position for use, a brake shoe carried by said support so as to be closely adjacent to the pulley when in operative position, the shoe being mounted for movement relative to the support, and means under the control of the operator for moving said brake shoe so as to come into braking contact with said pulley when the device is in use.

2. A brake attachment for a lathe comprising a bracket having a foot portion formed to be secured upon the cap forming part of the bearing for the lathe spindle, said bracket extending from the foot portion thereof normally upward and then substantially horizontal and being of such length as to overly the belt surface of the lathe pulley which is normally between the parts of the belt which extend from said pulley at opposite sides thereof when the device is in position for use, a brake shoe movably mounted on said bracket for movement into and out of engagement with the pulley when in operative position for use, and lever means carried by the bracket and operatively connected to said brake shoe for moving the shoe into engagement with the pulley when the device is in position for use.

3. The combination of a lathe having a supporting frame for a pulley, a belt pulley having a journal rotatably mounted in said supporting frame, a cap for said journal, said cap forming a part of the bearing for said journal, means for holding said cap in operative position, a support secured upon said cap, said support extending to a place adjacent to said pulley, a brake shoe carried by said support, said brake shoe being movably mounted so as to move into and out of engagement with said pulley, and means under the control of the operator carried by the bracket and operatively connected to said brake shoe for moving the shoe into braking engagement with said pulley.

4. A brake attachment for a lathe having a pulley rotatably mounted on a spindle and having a cap for said spindle, comprising in combination a support formed to be secured upon the spindle cap, said support extending upward and then substantially horizontal so as normally to overlie a portion of the pulley between the belt parts normally extending from opposite sides thereof, a brake shoe thicker at one end than at the other positioned beneath and substantially against the substantially horizontal part of said support, said shoe normally being in close relation to the pulley, a projection extending upward from said shoe, a slot in said substantially horizontal part of the support for accommodating movably said projection, said slot extending normally crosswise of the lathe, a hand lever secured to said projection and spring means for moving the shoe in a direction which normally takes it out of contact with the pulley.

EPHRAIM M. FAUST.